United States Patent [19]

VanNeste

[11] Patent Number: 4,826,309

[45] Date of Patent: May 2, 1989

[54] EYEGLASS CONSTRUCTION

[76] Inventor: Kenneth J. VanNeste, 11 Country La., Canton, Mass. 02021

[21] Appl. No.: 98,916

[22] Filed: Sep. 8, 1987

[51] Int. Cl.$^4$ .......................... G02C 5/14; G02C 5/20
[52] U.S. Cl. .................................... 351/114; 351/111; 351/118
[58] Field of Search ....................... 351/111, 114, 118; 2/13, 448, 449, 450

[56] References Cited

U.S. PATENT DOCUMENTS 2,012,759  8/1935  Hefner .................................. 351/114

FOREIGN PATENT DOCUMENTS 8600012  1/1986  PCT Int'l Appl. ................ 351/114

Primary Examiner—Rodney B. Bovernick
Attorney, Agent, or Firm—Wolf, Greenfield & Sacks

[57] ABSTRACT

A pair of eyeglasses or sunglasses in which there are eyeglass frames having a pair of support arms hinged therefrom. Each of the support arms has disposed between the ends thereof hollow resilient fluted coupling members having a plurality of linearly disposed contiguous flutes adapted to be adjustable in at least two different positions including a first position in which the flutes are closed to provide a first arm length, and a second position in which at least some of the flutes are open to provide a second arm length that is longer than the first arm length.

8 Claims, 2 Drawing Sheets

EYEGLASS CONSTRUCTION

BACKGROUND OF THE INVENTION

1. Field of the Invention

The present invention relates in general to eyeglass construction, and pertains, more particularly to an improved eyeglass or sunglass frame, and in particular the support arms associated with the eyeglass frame.

2. Background Discussion

The prior art known to the applicant includes three U.S. patents that describe various eyeglass constructions. A discussion now follows of these U.S. patents.

U.S. Pat. No. 1,701,099, to Nerney describes an eyeglass construction in which the earpiece end of the support arm or temple bar is flexible and thus adjustable to the ear.

U.S. Pat. No. 2,887,929, to Farmer describes an adjustable eyeglass bowl. However, it is noted that the adjustment feature described therein is of extremely complex construction and only provides for minimal adjustment.

U.S. Pat. No. 4,377,328, to Ferrandi describes a spectacle frame employing flexible elements. However, these flexible elements are constructed of helical springs and thus are relatively rigid. Furthermore, this patent does not describe any adjustable length feature.

SUMMARY OF THE INVENTION

It is a object of the present invention to provide an improved eyeglass or sunglass construction in which the support arm for the frame includes a unique coupling means that provides both universal bending as well as a substantial range of linear adjustment. The universal bending prevents damage to the eyeglasses or sunglasses. In this regard, it is noted that many times eyeglasses or sunglasses are broken when one sits on them or otherwise applies pressure, particularly at the arm. By having at least a segment of each support arm provided with this unique coupling means substantial damage to the eyeglasses or sunglasses is prevented.

Another object of the present invention is to provide a unique coupling means as recited in the preceding object and in which both the universal flexibility and the adjustability can be carried out with a single hollow and resilient fluted coupling element.

A further object of the present invention is to provide an improved eyeglass construction as in accordance with the preceding objects and in which there may be additionally provided a hollow and resilient fluted means at the ear end of the support arm for providing adjustment and contouring to the ear.

To accomplish the foregoing and other objects, features, and advantages of the invention, there is provided a pair of eyeglasses or sunglasses that are comprised of a pair of frames. These frames typically may hold either prescription or non-prescription glass or may also be of sunglass type in which the glass elements may be replaced by plexiglass or similar plastic elements. The frame includes a pair of support arms. Means are provided for hingedly securing one end of each support arm to a respective frame. Means are provided at the other end of each support arm defining an ear support loop. Each of the support arms have disposed between the ends thereof hollow resilient fluted coupling means. Each of these coupling means has a plurality of linearly disposed contiguous flutes adapted to be adjustable in at least two different positions including a first position in which the flutes are closed to provide a first arm length, and a second position in which at least some of the flutes are open to provide a second arm length that is longer than the first arm length. The fluted coupling means is preferably constructed of plastic and the flutes are integrally hinged from one to the next flute and each have either an open extended position or a closed position. The coupling means may be moved between different positions simply by pulling and pushing on opposite ends of the support arm. The flutes open and close in a snap coupling manner. It is furthermore noted that the coupling means is of substantially circular cross section and thus, in addition to having the length-adjusting feature, can also be bent universally in any angle, although they would be kept straight when in use. However, when the eyeglasses or sunglasses are not in use, should the arm be deflected or crushed for any reason, the resiliency of the coupling means would prevent damage to the support arms.

BRIEF DESCRIPTION OF THE DRAWINGS

Numerous other objects, features, and advantages of the invention should now become apparent upon a reading of the following detailed description taken in conjunction with the accompanying drawings, in which.

DETAILED DESCRIPTION

Figure 1A:
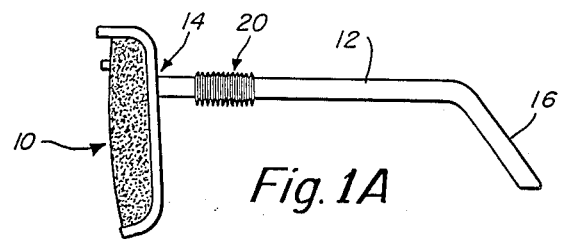
FIGS. 1a and 1b illustrate a first embodiment of the present invention in respective compressed and expanded positions.

Reference is now made to the drawings for an illustration of a number of different embodiments employing the coupling member of the present invention. This coupling member is employed in each of the support arms of the eyeglass frame. Because each of the arms is of substantially identical construction, only one arm is described herein. Each of the support arms has disposed between the ends thereof a hollow resilient fluted coupling means having a plurality of linearly disposed contiguous flutes adapted to be adjustable in at least two different positions including a first position in which the flutes are closed to provide a first arm length, and a second position in which at least some of the flutes are open to provide a second arm length that is longer than the first arm length. The product described herein is of generally hard plastic construction, although, the hollow resilient fluted coupling means is of softer, pliable plastic construction.

In the different embodiments to be now described, like reference characters are used to indicate like parts of the eyeglass construction throughout these different embodiments. With specific reference to FIGS. 1a and 1b, there is illustrated an eyeglass or sunglass having a lens or glass support frame 10. Extending from the basic lens support frame are a pair of arms, only one of which is illustrated in the drawings as arm 12 in the embodiments of FIGS. 1a and 1b. The arm 12 has at one end a conventional hinge that may be at 14 that enables the support arm to be bent in the conventional manner. The other end of the support arm 12 is bent as illustrated at 16 in FIGS. 1a and 1b to provide a conventional form of ear loop.

Figure 1B:
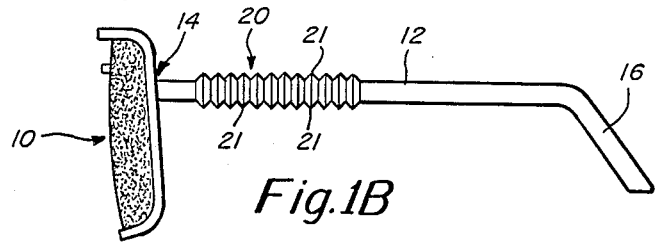

FIG. 1a illustrates the coupling member at 20 in a fully compressed position. FIG. 1b on the other hand illustrates the coupling member 20 in a fully expanded position. Furthermore, from the position of FIG. 1b, one can compress some of the flutes 21 while leaving other ones expanded. In this way, there may be thus provided for an incremental adjustment of the length. The difference in length of the arms between FIGS. 1a and 1b represent the maximum difference. However, by compressing only some of the flutes virtually any other incremental length can be arrived at. In the particular embodiment of FIG. 1b, there are twelve flutes and thus there are actually twelve different positional adjustments that can be made between the two extremes as illustrated in FIGS. 1a and 1b.

Figure 5A:
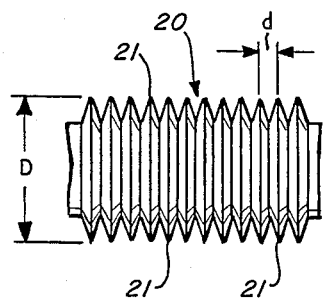
FIGS. 5a and 5b show respective enlarged views of the coupling member of the present invention in respective compressed and expanded configurations.
Figure 5B:
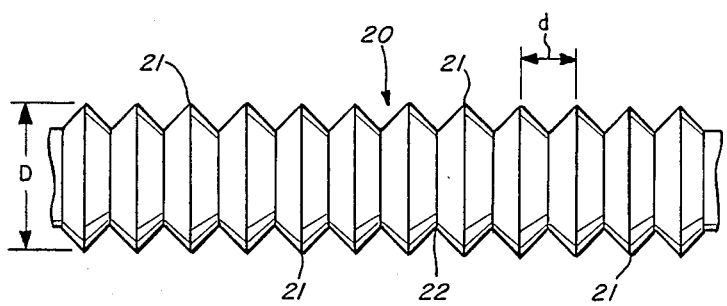

Now, with regard to the configuration of the flutes in the different positions, refer to FIGS. 5a and 5b. FIG. 5a illustrates the position corresponding to FIG. 1a while FIG. 5b illustrates the position of the coupling member as it relates to FIG. 1b. In FIG. 5b, the flutes may be considered as being in their open position the distance between the flutes 21, dimension d in FIG. 5b being at its maximum. In comparison, note the significantly smaller dimension d in FIG. 5a. Once again, these flutes can be opened and closed, the closed position being illustrated in FIG. 5a, by simply compressing each end of the coupling member or by pulling from either end on the coupling member. When the coupling member is compressed, then the flutes close and when the coupling member is expanded, then the flutes open. It is furthermore to be noted that in either of the positions of FIGS. 5a or 5b the member is hollow. Furthermore, the coupling member 20 is resilient and in addition to having the capability of this linear adjustment, can also be bent at any angle. In this way, the support arm 12 on either side of the coupling member may put into different relative, non-linear alignment positions without causing any breakage in the support arm. The flutes permit a bending action similar to that shown at the ear support loop end in FIG. 2b. It is noted therein, when the coupling member bends then on one side the individual flutes are essentially closed, while on the other side they are open.

The flutes 21 illustrated in FIG. 5b essentially hinge at 21 in FIG. 5b and by compressing with force inward from either end of a coupling member, the flute can be made to close by essentially pivoting at hinge line 22. When the flutes are in their open position as illustrated in FIG. 5b, they have a diameter as illustrated by diameter D in FIG. 5b. A similar dimension is also shown in FIG. 5a but the diameter in FIG. 5a is larger than in FIG. 5b. This is because when closing the flutes from a position of FIG. 5b, there is certain outer expansion from a diameter standpoint. The difference in the diameters from FIG. 5a to FIG. 5b may be only slight.

Figure 2A:
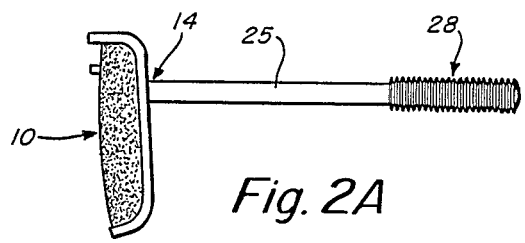
FIGS. 2a and 2b illustrate a second embodiment of the present invention in respective linear and curved configuration.
Figure 2B:
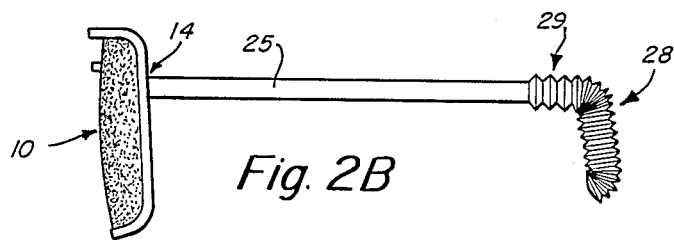

FIGS. 2a and 2b illustrate a further embodiment of the present invention showing a support arm 25 with hinging at 14 and having a flexible member as illustrated at 28. The construction of the flexible member is substantially the same as illustrated in FIGS. 5a and 5b. In FIG. 2a the flexible member 28 is shown in its compressed position which might be the position that is used when the eyeglasses are not in use. FIG. 2b illustrates the position in which the flexible member 28 has been bent to the user's ear configuration. Also note in FIG. 2b that some initial flutes at 29 are shown open to provide also for some length adjustment.

Figure 3A:
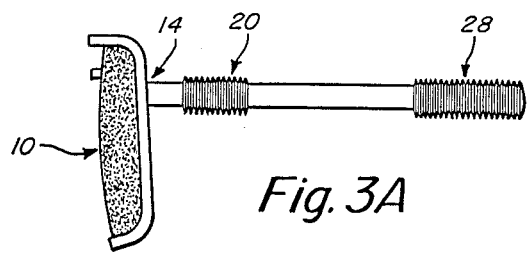
FIGS. 3a and 3b illustrate still a further embodiment of the present invention in respective compressed and expanded positions.
Figure 3B:
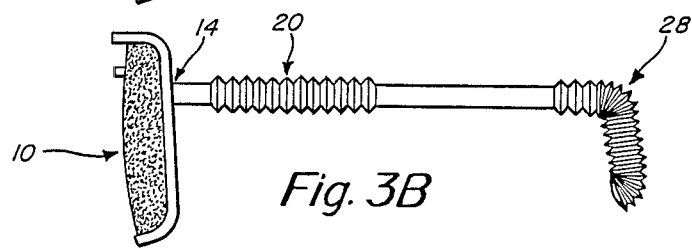

Reference is now made to FIGS. 3a and 3b for still a further embodiment of the present invention in which there is employed a coupling member 20 substantially illustrated in FIGS. 1a and 1b along with a flexible member 28 as substantially illustrated in FIGS. 2a and 2b. Thus, FIGS. 3a and 3b use the combination of both a coupling member for adjustment of length and bending, as well as a flexible end member 28 that can be contoured to accommodate the user's ear.

Figure 4A:
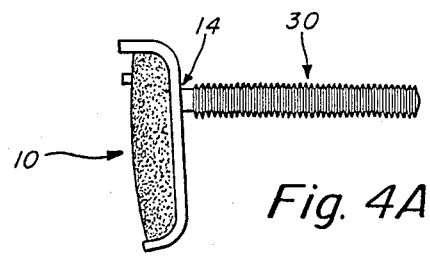
FIGS. 4a and 4b illustrate still another embodiment of the present invention in respective contracted and expanded configurations.
Figure 4B:
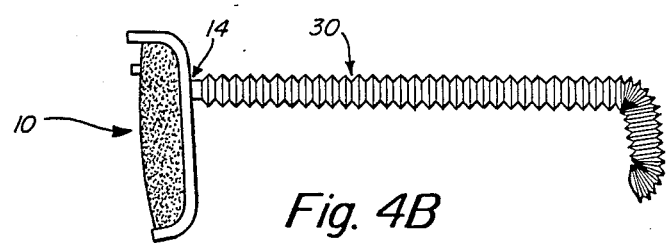

Finally, FIGS. 4a and 4b illustrate another embodiment of the present invention in which substantially the entire arm is constructed of a fluted member 30. In FIG. 4a the member 30 is shown as compressed position which may be the position for carrying of the eyeglasses. FIG. 4b illustrates the expanded position in which the very end is bent to provide the ear loop.

Thus, in accordance with the present invention, there have now been described herein a number of different embodiments in which the fluted member may be employed. This is employed in one arrangement so that it can be moved between two different positions including a first position in which the flutes are closed and a second position in which at least some of the flutes are open. Furthermore, the fluted member in accordance with the invention may also be employed at the free end of the support arm so that it can be readily configured into an ear support loop.

Having now described a limited number of embodiments of the present invention, it should be apparent to those skilled in the art that numerous other embodiments and modifications thereof are contemplated as following within the scope of the present invention as defined by the appended claims.

What is claimed is:

1. A pair of eyeglasses comprising;
a pair of eyeglass frames;
a pair of support arms for the respective frames,
means hingedly securing one end of each support arm to a respective frame,
means at the other end of each support arm defining an ear support loop,
each said support arm having between the ends thereof hollow resilient fluted coupling means having a plurality of linearly disposed contiguous flutes adapted to be adjustable in at least two different positions including a first position in which at least some of the flutes are closed to provide a first arm length, and a second position in which at least some of the flutes are open to provide a second arm length that is longer than said first arm length,
said hollow resilient fluted coupling means comprising a fluted circular-cross-section coupling tube having the respective flutes thereof defined at least in part by a minimum diameter flute-defining, hinge ring, a maximum diameter flute-defining hinge ring, and flute wall means of frusto-conic configuration transitioning between said minimum and maximum diameter hinge rings,
said individual flutes being moved between open and closed positions by snap coupling so as to open a number of flutes as it relates to the desired overall length of the hollow resilient fluted coupling means, said minimum and maximum diameter hinge rings being in closer relative proximity to each other in the closed position of a flute than in the open position thereof.

2. A pair of eyeglasses as set forth in claim 1 wherein the fluted coupling means is of plastic and the flutes are integrally hinged from one to the next flute and each have either an open extended position or a closed position.

3. A pair of eyeglasses as set forth in claim 1 wherein the flutes have a greater maximum diameter in the closed position than in the open position.

4. A pair of eyeglasses as set forth in claim 1 wherein the ear support loop is rigid.

5. A pair of eyeglasses as set forth in claim 1 wherein the means defining an ear support loop comprises a second fluted means having a plurality of contiguous flutes that may be bent into a loop configuration.

6. A pair of eyeglasses as set forth in claim 5 wherein the hollow resilient fluted coupling means and the second fluted means are contiguous.

7. A pair of eyeglasses as set forth in claim 1 wherein each flute is further defined by a second minimum diameter flute-defining injuring and associated second flute wall means of frusto-conic configuration.

8. A pair of eyeglasses as set forth in claim 1 wherein said hollow resilient fluted coupling means has a length in its closed position that is substantially less than the overall length of the support arm.

* * * * *